United States Patent
Xiao et al.

(10) Patent No.: US 10,476,074 B2
(45) Date of Patent: Nov. 12, 2019

(54) METHODS OF MAKING ELECTROACTIVE COMPOSITE MATERIALS FOR AN ELECTROCHEMICAL CELL

(71) Applicant: GM Global Technology Operations LLC, Detroit, MI (US)

(72) Inventors: Xingcheng Xiao, Troy, MI (US); Jingmei Shen, Troy, MI (US); Mei Cai, Bloomfield Hills, MI (US); Martin S. Ruthkosky, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/661,240

(22) Filed: Jul. 27, 2017

(65) Prior Publication Data

US 2019/0036111 A1    Jan. 31, 2019

(51) Int. Cl.
*H01M 4/36* (2006.01)
*H01M 4/38* (2006.01)
*H01M 4/58* (2010.01)
*C23C 24/02* (2006.01)
*H01M 10/0525* (2010.01)
*H01M 4/587* (2010.01)
(Continued)

(52) U.S. Cl.
CPC ............. *H01M 4/366* (2013.01); *C23C 24/02* (2013.01); *H01M 4/1391* (2013.01); *H01M 4/1393* (2013.01); *H01M 4/1395* (2013.01); *H01M 4/364* (2013.01); *H01M 4/386* (2013.01); *H01M 4/505* (2013.01); *H01M 4/525* (2013.01); *H01M 4/587* (2013.01); *H01M 10/0525* (2013.01); *H01M 2220/20* (2013.01)

(58) Field of Classification Search
None
See application file for complete search history.

(56) References Cited

U.S. PATENT DOCUMENTS 5,372,845 A * 12/1994 Rangaswamy ........... B22F 9/04
                                                            427/216
8,663,840 B2    3/2014 Nazri et al.
(Continued)

FOREIGN PATENT DOCUMENTS

WO    WO 2005113143    * 12/2005

*Primary Examiner* — Jonathan Crepeau
(74) *Attorney, Agent, or Firm* — Harness, Dickey & Pierce, P.L.C.

(57) ABSTRACT

Methods for making electroactive composite materials for electrochemical cells are provided. The method includes introducing a particle mixture comprising a first particle having a first diameter ($R_1$) and comprising a first electroactive material and a second particle having a second diameter ($R_2$) smaller than the first diameter ($R_1$) and comprising a second electroactive material into a dry-coating device having a rotatable vessel defining a cavity and a rotor disposed therewithin. The vessel is rotated at a first speed in a first direction, and the rotor is rotated at a second speed greater than the first speed in a second direction opposing the first direction. The particle mixture flows between cavity walls and the rotor and experiences thrusting and compression forces that create a substantially uniform coating comprising the second electroactive material on one or more exposed surfaces of the first particle.

20 Claims, 7 Drawing Sheets

(51) Int. Cl.
  *H01M 4/505*     (2010.01)
  *H01M 4/525*     (2010.01)
  *H01M 4/1391*    (2010.01)
  *H01M 4/1393*    (2010.01)
  *H01M 4/1395*    (2010.01)

(56) References Cited

U.S. PATENT DOCUMENTS

| | | |
|---|---|---|
| 8,974,946 B2 | 3/2015 | Cai et al. |
| 8,999,584 B2 | 4/2015 | Jiang et al. |
| 9,028,565 B2 | 5/2015 | Huang |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,350,046 B2 | 5/2016 | Huang |
| 9,362,551 B2 | 6/2016 | Sachdev et al. |
| 9,362,552 B2 | 6/2016 | Sohn et al. |
| 9,412,986 B2 | 8/2016 | Huang |
| 9,537,144 B2 | 1/2017 | Huang et al. |
| 2012/0056136 A1* | 3/2012 | Sasaki ............ H01B 1/22 252/512 |
| 2012/0169447 A1* | 7/2012 | Yang ............ H01B 1/22 336/200 |
| 2012/0229096 A1 | 9/2012 | Nazri |
| 2012/0231321 A1 | 9/2012 | Huang et al. |
| 2013/0284338 A1 | 10/2013 | Xiao et al. |
| 2014/0272526 A1 | 9/2014 | Huang |
| 2014/0272558 A1 | 9/2014 | Xiao et al. |
| 2015/0014890 A1 | 1/2015 | Xiao |
| 2016/0013479 A1* | 1/2016 | Iwasaki ............ H01M 4/366 429/305 |
| 2016/0111721 A1 | 4/2016 | Xiao et al. |

\* cited by examiner

METHODS OF MAKING ELECTROACTIVE COMPOSITE MATERIALS FOR AN ELECTROCHEMICAL CELL

INTRODUCTION

This section provides background information related to the present disclosure which is not necessarily prior art.

The present disclosure relates to solvent-free methods of making an electroactive composite material for an electrochemical cell including introducing a particle mixture into a rotatable dry-coating device, wherein a first particle in the particle mixture has a first average diameter ($R_1$) and includes a first electroactive material and a second particle has a second average diameter ($R_2$) and includes a second electroactive material, and wherein the second electroactive material creates a substantially uniform coating on one or more exposed surfaces of the first particle including the first electroactive material.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion batteries comprise a first electrode, a second electrode, an electrolyte material, and a separator. One electrode serves as a positive electrode or cathode and another serves as a negative electrode or anode. A stack of lithium-ion battery cells may be electrically connected to increase overall output. Conventional rechargeable lithium-ion batteries operate by reversibly passing lithium ions back and forth between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium ion battery. By way of non-limiting example, cathode materials for lithium batteries typically comprise an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent.

The negative electrode typically includes a lithium insertion material or an alloy host material. Typical electroactive materials for forming an anode include lithium-graphite intercalation compounds, lithium-silicon intercalation compounds, lithium-tin intercalation compounds, lithium alloys. While graphite compounds are most common, recently, anode materials with high specific capacity (in comparison with graphite) are of growing interest. For example, silicon has the highest known theoretical charge capacity for lithium, making it one of the most promising materials for rechargeable lithium ion batteries.

However, current anode materials comprising silicon, or similar large volume expansion material, such as tin or germanium, suffer from significant drawbacks. Large volume changes (e.g., volume expansion/contraction of greater than 300%) of silicon-containing materials during lithium insertion/extraction (e.g., intercalation/alloy and deintercalation/dealloy-intercalation/alloy) can result in physical damage to the electrode, including wrinkling, fracture, or cracking. Such volumetric expansion thus can lead to loss of electrical contact and electrode activity. This is especially true at the loading density levels required for commercial viability of silicon-containing electrodes. The large volumetric expansion during intercalation/alloy of the anode comprising silicon, or other large volume expansion materials, can thus result in a decline of electrochemical cyclic performance, diminished Coulombic charge capacity (capacity fade), and extremely limited, poor cycle life.

It would be desirable to develop high performance electrode materials, for example, including silicon (Si), or similar materials with high specific capacity, for use in high energy lithium ion batteries, which overcome the current shortcomings that prevent their widespread commercial use, especially in vehicle applications. For long term and effective use, negative electrode/anode materials containing large volume expansion materials should be capable of being included at high loading densities, while avoiding physical damage to provide minimal capacity fade and maximized charge capacity for long-term use in lithium ion batteries.

SUMMARY

This section provides a general summary of the disclosure, and is not a comprehensive disclosure of its full scope or all of its features.

In various aspects, the present disclosure provides an exemplary method of making an electroactive composite material for an electrochemical cell. The method may include introducing a particle mixture into a dry-coating device including a rotatable vessel having a wall defining a cavity and a rotor disposed within the cavity; rotating the vessel at a first speed in a first direction; and rotating the rotor at a second speed greater than the first speed in a second direction opposite to the first direction. The particle mixture may include a first particle having a first average diameter ($R_1$) that includes a first electroactive material, and a second particle having a second average diameter ($R_2$) that includes a second electroactive material. The first average diameter ($R_1$) may be greater than the second average diameter ($R_2$). The second electroactive material may be selected from the group consisting of lithium (Li), graphite, silicon (Si), tin (Sn), and combinations thereof. A minimum clearance (C) may exist between the wall of the cavity and the rotor. The minimum clearance (C) may be equal to a sum of the first average diameter ($R_1$) and two time the second average diameter ($R_2$), so that $C \geq R_1 + 2R_2$. The particle mixture introduced into the dry-coating device may flow between the walls defining the cavity and the rotor at the clearance that may consequently experience thrusting and compression forces to create a substantially uniform coating including the second electroactive material on one or more exposed surfaces of the first particle.

In one variation, the substantially uniform coating including the second electroactive material may cover greater than or equal to about 70% of the exposed surfaces of the first particle.

In one variation, the particle mixture may include greater than or equal to about 95 weight % of the first particle and less than or equal to about 5 weight % of the second particle.

In one variation, the first average diameter ($R_1$) of the first particle may be greater than or equal to about 1 μm to less than or equal to about 100 μm, and the second average diameter ($R_2$) of the second particle may be less than or equal to about 5 μm.

In one variation, the first electroactive material of the first particle may include a positive electrode material selected from the group consisting of silicon (Si), lithium manganese nickel cobalt oxide ($LiNiMnCoO_2$), and combinations thereof. The second electroactive material of the second particle may be selected from the group consisting of graphite, graphene, graphene platelet, and combinations thereof. The rotor of the dry-coating device may exfoliate the graphite to form a substantially uniform coating of graphene on the one or more exposed surfaces of the first particle.

In one variation, the first electroactive material of the first particle may include graphite and the second electroactive material of the second particle may include silicon (Si). The rotor of the dry-coating device may dispose a plurality of the second particles on one or more exposed surfaces of the first particle to form a substantially uniform coating.

In one variation, the minimum clearance (C) between the wall of the cavity and the rotor may be greater than or equal to about 0.05 mm and less than or equal to about 1 mm.

In one variation, the cavity and rotor of the dry-coating device each have an elliptical cross sectional shape.

In one variation, the vessel and rotor of the dry-coating device are each rotated for a time greater than or equal to about 5 minutes to less than or equal to about 120 minutes.

In one variation, the first speed of the vessel of the dry-coating device is greater than or equal to about 50 rpm to less than or equal to about 100 rpm, and the second speed of the rotor of the dry-coating device is greater than or equal to about 1000 rpm to less than or equal to about 6000 rpm.

In other aspects, the present disclosure provides another exemplary method of making an electroactive composite material for an electrochemical cell. The method may including introducing a particle mixture into a dry-coating device including a rotatable vessel having a wall defining a cavity with an elliptical cross-sectional shape and an elliptical shaped rotor disposed within the cavity; rotating the rotatable vessel at a first speed in a first direction; and rotating the elliptical shaped rotor at a second speed greater than the first speed in a second direction opposing the first direction. The particle mixture may include a first particle including a first electroactive material and a second particle including a second electroactive material. The second electroactive material may be selected from the group consisting of lithium (Li), graphite, silicon (Si), tin (Sn), and combinations. The first particle may have a first average diameter ($R_1$) that is greater than or equal to about 1 μm to less than or equal to about 100 μm. The second particle may have a second average diameter ($R_2$) that is less than or equal to about 5 μm. A minimum clearance (C) may exist between the wall of the cavity and the rotor. The minimum clearance (C) may be greater than or equal to a sum of the first average diameter ($R_1$) and two times the second average diameter ($R_2$), so that $C \geq R_1 + 2R_2$. The particle mixture introduced into the dry-coating device may flow between the wall defining the cavity and the elliptical shaped rotor at the clearance that may consequently experience thrusting and compression forces to create a substantially uniform coating including the second electroactive material on the one or more exposed surfaces of the first particle.

In one variation, the first electroactive material of the first particle may include graphite and the second electroactive material of the second particle may include silicon (Si). The rotor may dispose a plurality of the second particles on the one or more exposed surfaces of the first particle to form the substantially uniform coating.

In one variation, the first electroactive material of the first particle may include a positive electrode material selected from the group consisting of silicon (Si), lithium manganese nickel cobalt oxide ($LiNiMnCoO_2$), and combinations thereof. The second electroactive material of the second particle may be selected from the group consisting of: graphite, graphene, graphene platelet, and combinations thereof. The rotor of the dry-coating device may exfoliate the graphite to form a substantially uniform coating of graphene on the one or more exposed surfaces of the first particle.

In one variation, the minimum clearance (C) is greater than or equal to about 0.05 mm and less than or equal to about 1 mm.

In one variation, the substantially uniform coating including the second electroactive material may cover greater than or equal to about 70% of the exposed surface of the first particle. The substantially uniform coating may have a thickness of greater than or equal to about 1 nm to less than or equal to about 1 μm.

In one variation, the particle mixture may include greater than or equal to about 95% of the first particle and less than or equal to about 5% of the second particle.

In one variation, the vessel and rotor of the dry-coating device may rotate for a time greater than or equal to about 5 minutes to less than or equal to about 120 minutes. The first rotation speed of the vessel may be greater than or equal to about 50 rpm to less than or equal to about 100 rpm. The second rotation speed of the rotor may be greater than or equal to about 1000 rpm to less than or equal to about 6000 rpm.

In other aspects, the present disclosure provides an electroactive composite material of an electrochemical cell. The electroactive composite material may include an electrochemically active composite including a first particle including a first electroactive material and having one or more exposed surfaces. A substantially uniform exfoliated coating may be disposed on the one or more exposed surfaces of the first particle. The first particle may have a first average diameter ($R_1$) of greater than or equal to about 1 μm to less than or equal to about 100, and the substantially uniform exfoliated graphene coating may have a thickness less than or equal to about 1 μm. The substantially uniform exfoliated graphene coating may cover greater than or equal to about 70% of the exposed surface of the first particle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is a scanning electron microscope image of the exemplary electroactive composite material of FIG. 3, while FIG. 4B is a scanning electron microscope image of a comparative electroactive composite material prepared using pestle mixing;

Corresponding reference numerals indicate corresponding parts throughout the several views of the drawings.

DETAILED DESCRIPTION

Figure 1:
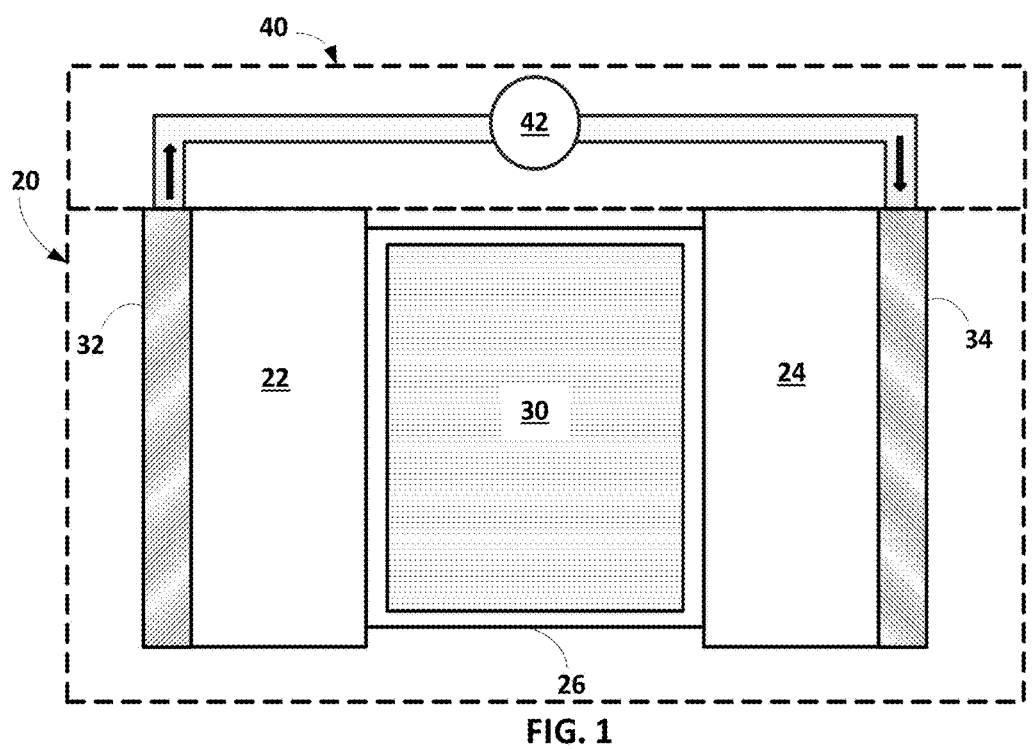
FIG. 1 is a schematic of an exemplary electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electroactive composite materials for electrochemical cells, especially lithium ion batteries, which may be used in vehicle applications. An exemplary and schematic illustration of an electrochemical cell that cycles lithium ions (e.g., a lithium-ion battery) 20 is shown in FIG. 1. Lithium-ion battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22, and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to form intercalated or alloyed lithium at the positive electrode 24. The electric current passing through the external circuit 40 can be harnessed and directed through the load device 42 until the intercalated lithium in the negative electrode 22 is depleted and the capacity of the lithium-ion battery 20 is diminished.

The lithium-ion battery 20 can be charged or re-energized at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the lithium-ion battery 20 can include a variety of other components that while not depicted here are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and power if it is required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

With renewed reference to FIG. 1, the porous separator 26 may include, in instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26.

The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

The polyolefin layer, and any other optional polymer layers, may further be included in the microporous polymer separator 26 as a fibrous layer to help provide the microporous polymer separator 26 with appropriate structural and porosity characteristics. Thus, the nanoporous or microporous membrane 26 may contain a single layer or a multi-layer laminate fabricated from either a dry or wet process, by solvent casting, by a non-woven fiber laying process, or by any other process for making a nanoporous or microporous membrane 26 with properties suitable for application in Li-ion batteries. For example, in one example, a single layer of the polyolefin may constitute the entirety of the separator membrane 26. In another example, a single layer of one or a combination of any of the polymers from which the separator 26 may be formed (e.g., the polyolefin and/or one or more of the other polymers listed above for the separator 26) may constitute the entirety of the separator 26.

As another example, however, multiple discrete layers of similar or dissimilar polyolefins and/or polymers for the separator 26 may be assembled together. In one example, a discrete layer of one or more of the polymers may be coated on a discrete layer of the polyolefin for the separator 26. Further, the polyolefin (and/or other polymer) layer, and any other optional polymer layers, may further be included in the separator 26 as a fibrous layer to help provide the separator 26 with appropriate structural and porosity characteristics. A more complete discussion of single and multi-layer lithium-ion battery separators, and the dry and wet processes that may be used to make them, can be found in P. Arora and Z. Zhang, "Battery Separators," *Chem. Rev.*, 104, 4424-4427 (2004).

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In various aspects, the positive electrode 24 may be formed from a lithium-based active material that can sufficiently undergo lithium intercalation and deintercalation or alloying and dealloying, while functioning as the positive terminal of the lithium-ion battery 20. The positive electrode 24 may include a polymeric binder material to structurally fortify the lithium-based active material. The positive electrode 24 electroactive materials may include one or more transition metals, such as manganese (Mn), nickel (Ni), cobalt (Co), chromium (Cr), iron (Fe), vanadium (V), and combinations thereof.

Two exemplary common classes of known electroactive materials that can be used to form the positive electrode 24 are lithium transition metal oxides with layered structure and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_{(2-x)}O_4$), where $0 \leq x \leq 1$, and/or a lithium manganese nickel cobalt oxide (e.g., $LiMn_{1/3}Ni_{1/3}Co_{1/3}O_2$).

Such active materials may be intermingled with an optional electrically conductive material and at least one polymeric binder, for example, by slurry casting active materials and optional conductive materials with such binders, like polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum or any other appropriate electrically conductive material known to those of skill in the art.

The separator 26, the negative electrode 22, and the positive electrode 24 may include an electrolyte system 30, capable of conducting lithium ions between the negative electrode 22 and the positive electrode 24. The electrolyte system 30 may be a non-aqueous liquid electrolyte solution including at least one lithium salt dissolved in an organic solvent or a mixture of organic solvents. The one or more lithium salts may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis (trifluoromethanesulfonimide) ($LiN(CF_3SO_2)_2$); lithium bis (fluorosulfonylimide) ($LiN(FSO_2)_2$); and combinations thereof. These and other similar lithium salts may be dissolved in a variety of organic solvents, including but not limited to various alkyl carbonates, such as cyclic carbonates (e.g., ethylene carbonate (EC), propylene carbonate (PC), butylene carbonate (BC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), and combinations thereof.

In various aspects, the negative electrode 22 includes an electroactive material as a lithium host material capable of functioning as a negative terminal of a lithium-ion battery. The negative electrode 22 may thus include the electroactive lithium host material and optionally another electrically conductive material, as well as one or more polymeric binder materials to structurally hold the lithium host material together. For example, in certain instances, the negative electrode 22 may include an active material including graphite, silicon (Si), tin (Sn), or other negative electrode particles intermingled with a binder material selected from the group consisting of: polyvinylidene difluoride (PVdF), ethylene propylene diene monomer (EPDM) rubber, or carboxymethoxy cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

The negative electrode 22 may include an electroactive material selected from the group consisting of: graphite, silicon (Si), tin (Sn), germanium (Ge), bismuth (Bi), zinc (Zn), tellurium (Te), lead (Pb), gallium (Ga), aluminum (Al), arsenic (As), lithium (Li), alloys, oxides, and combinations thereof. Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America.

Similarly, negative electrode or anode materials with relatively high specific capacity (e.g., silicon) are often desirable for use as negative electrode 22 active material. However, these electroactive material materials often undergo substantial (e.g., greater than or equal to about 100%) volumetric expansion and contraction during cycling of the electrochemical cell 20, which may result in particle cracking, fracturing, pulverization, and, in certain instances, loss of active materials. By way of example, in certain instances, the negative electrode 22 may include a carbon-containing and/or silicon-containing electroactive material. Exemplary silicon-containing electroactive materials include lithium-silicon and silicon containing binary and ternary alloys, such as Si—Sn; SiSnFe; SiSnAl; SiFeCo; $SiO_x$, where $0 \le x \le 2$; and the like. Silicon-containing electroactive materials undergo substantial volumetric expansion (e.g., greater than or equal to about 300%) and contraction during the cycling of the electrochemical cell 20. As noted, the substantial volumetric expansion and contraction experienced during cycling and operation may result in physical damage to the electrode materials, including wrinkling, fracture, or cracking of the electrode active materials and current collectors coupled thereto, which may result in a loss of electrical contact (e.g., isolation of the active materials) and capacity loss (e.g., poor life cycling).

Electrochemically active composite materials (e.g., silicon-carbon composite materials) improve cycle stability and suppression of mechanical degradation within the electrochemical cell 20 that may result from volumetric expansion of the electroactive material comprising the negative electrode 22. In various aspects, the electroactive material of the negative electrode 22 may include an electrochemically active composite including a first particle and a second particle or portions of a second particle. The first particle comprises a first electroactive material and the second particle comprises a second electroactive material. The second electroactive material originating from the second particle may form a substantially uniform coating on one or more exposed surfaces of the first particle comprising the first electroactive material. The substantially uniform coating comprising the second electroactive material may cover greater than or equal to about 70% of the one or more exposed surfaces of the first particle, optionally greater than or equal to about 75%, optionally greater than or equal to about 80%, optionally greater than or equal to about 85%, optionally greater than or equal to about 90%, and in certain variations, optionally greater than or equal to about 95%. The first particle has a first average diameter ($R_1$) that is larger than a second average diameter ($R_2$) of the second particle. For example, the first average diameter ($R_1$) of the first particle may be greater than or equal to about 1 μm to less than or equal to about 100 μm, optionally greater than or equal to about 5 μm to less than or equal to about 20 μm. The second average diameter ($R_2$) of the second particle may be less than or equal to about 5 μm, optionally less than or equal to about 1 μm.

The first and second electroactive materials may each be selected from the group consisting of: graphite, silicon (Si), tin (Sn), germanium (Ge), bismuth (Bi), zinc (Zn), tellurium (Te), lead (Pb), gallium (Ga), aluminum (Al), arsenic (As), lithium (Li), alloys, oxides, and combinations thereof. However, the second electroactive material is different from the first electroactive material. For example, in various instances, the first electroactive material of the first particle may comprise carbon (C) in the form of graphite and the second electroactive material of the second particle may comprise silicon (Si). The second silicon (Si) particles may be uniformly disposed on one or more exposed surfaces of the first graphite particles. In other instances, the first electroactive material of the first particle may comprise silicon (Si) and the second electroactive material of the second particle may comprise carbon (C) in the form of graphite. The graphite may be exfoliated, so that flakes or sheets of the graphite from the second particle are removed to form a substantially uniform coating of graphene disposed on one or more exposed surfaces of the silicon (Si) particles.

Figures 2A, 2B, 2C:
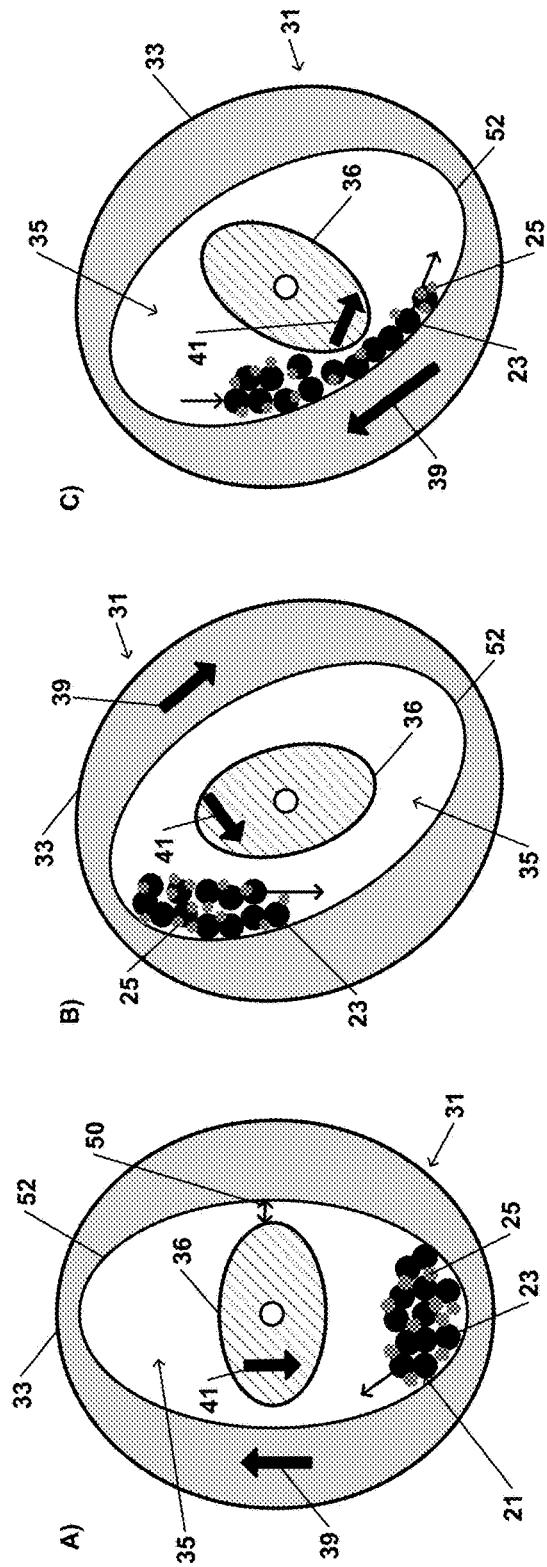
FIGS. 2A-2C is a schematic of an exemplary method for making an electroactive composite material using a dry-powder process in a dry-coating device according to certain aspects of the present disclosure.

FIGS. 2A-2C illustrate a dry-coating method (e.g., solvent-free process) for preparing an electroactive composite material for an electrochemical cell (e.g., lithium-ion battery 20). A particle mixture 21 including first particles 23 comprising a first electroactive material and second particles 25 comprising a second electroactive material is introduced into a dry-coating device 31. The second electroactive material is different from the first electroactive material, and the first particles 23 have a first average diameter ($R_1$) greater than a second average diameter ($R_2$) of the second particles 25. For example, the first average diameter ($R_1$) of the first particle may be greater than or equal to about 1 µm to less than or equal to about 100 µm, optionally greater than or equal to about 5 µm to less than or equal to about 20 µm. The second average diameter ($R_2$) of the second particle may be less than or equal to about 5 µm, optionally less than or equal to about 1 µm. The first and second electroactive materials may be selected from the group consisting of: graphite, silicon (Si), tin (Sn), germanium (Ge), bismuth (Bi), zinc (Zn), tellurium (Te), lead (Pb), gallium (Ga), aluminum (Al), arsenic (As), lithium (Li), alloys, oxides, and combinations thereof.

The dry-coating device 31 (e.g., Theta Composer) includes a rotatable vessel 33 having one or more cavity walls 52 that define an internal cavity 35 and a rotor 36 disposed within the internal cavity 35 of the vessel 33. The internal cavity 35 of the vessel 33 and the rotor 36 may each have an elliptical cross-sectional shape. The vessel 33 is rotatable at a first speed in a first direction 39. The rotor 36 is rotatable at a second speed in a second direction 41. The rotation speed of the rotor 36 (e.g., the second speed) is greater than the rotation speed of the vessel 33 (e.g., first speed). The vessel 33, thus, rotates at a slow speed in the first direction 39 and the rotor 36 rotates at a high speed in the second direction 41. For example, the first speed may be greater than or equal to about 50 rpm to less than or equal to about 100 rpm, optionally greater than or equal to about 50 rpm to less than or equal to about 70 rpm. The second speed may be greater than or equal to about 1000 rpm to less than or equal to about 10,000 rpm, optionally greater than or equal to about 1000 rpm to less than or equal to about 6000 rpm.

As illustrated in FIG. 2A, as the vessel 33 and rotor 36 rotate, a minimum clearance 50 is defined between the rotor 36 and the cavity walls 52 of the vessel 33 when they are at the closest point during their respective paths of travel. The clearance 50 between the rotor 36 and the vessel 33 is dependent on the relative size of the cavity 35 and the rotor 36 disposed therein and may be varied to produce the desired electroactive composite material. For example, in various aspects, the minimum clearance 50 between the rotor 36 and the cavity walls 52 of the vessel 33 may be defined by the diameters ($R_1$), ($R_2$) of the first and second particles 23, 25. The minimum clearance 50 may be equal to or greater than the first average diameter ($R_1$) of the first particle 23 plus two times the second average diameter ($R_2$) of the second particle 25. Thus, the minimum clearance 50 may be equal to or greater than $R_1+2R_2$, so that $C \geq R_1+2R_2$. In various aspects, the clearance 50 may be greater than or equal to about 0.05 mm and less than or equal to about 1 mm.

In various aspects, the particle mixture 21 is introduced into the cavity 35 of the vessel 33. The particle mixture 21 may include greater than or equal to about 5 weight percent to less than or equal to about 95 weight percent of the first particle 23, and greater than or equal to about 5 weight percent to less than or equal to about 95 weight percent of the second particle 25.

The vessel 33 and rotor 36 are rotated to blend the first and second particles 23, 25. The vessel 33 is rotated at the first speed in the first direction 39 and the rotor 36 is rotated at the second speed in the second direction 41. The vessel and rotor may be rotated for a predetermined time greater than or equal to about 5 minutes to less than or equal to about 120 minutes, optionally greater than or equal to about 5 minutes to less than or equal to about 30 minutes.

As illustrated in FIG. 2C, thrusting and compression forces at the clearance 50 or pinch point may cause dispersion of the particles 23, 25 comprising the particle mixture 21. The second particles 25 having a smaller average diameter ($R_2$) than the first particles 23 may be especially susceptible to the thrusting and compression forces. In various instances, the second particles 25 may be disposed on the exposed surfaces of the first particle 23 in a substantially uniform fashion by the rotation of the vessel 33 and rotor 36. For example only, in certain instances, a plurality of second silicon (Si) particles 25 may be uniformly disposed on one or more exposed surfaces of the first graphite particles 23. In other variations, the rotation of the vessel 33 and rotor 36 may exfoliate or remove portions of the second electroactive material from the second particles 25. Thus, the exfoliated or removed portions may have a thickness less than or equal to the clearance 50. The exfoliated or removed portions may be disposed onto one or more exposed surfaces of the first particle 23. For example only, in certain instances, the second graphite particle 25 may be exfoliated and a graphene layer may be disposed on one or more exposed surfaces of the first silicon (Si) particles. The graphene layer from the second particle 25 may wrap over and fuse with portions of the exposed surface of the first particle 23. The rotor 36 and vessels 33 may comprise materials capable of sustaining the high shear and compaction forces. For example, the rotor 36 may comprise zirconia (Zr) and the vessel 33 may comprise stainless steel that is surface treated to enhance hardness, for example, with nitride ($N^{3-}$) treatment.

In certain variations, the coverage (C) of exposed surface of the first particles 23 by the second electroactive material of the second particles 25 following the dry-powder process may be equal to:

$$C \times 100\% = N_c \frac{\pi R_2^2}{4\pi R_1^2} \times 100\% = \frac{M_2 R_1^3 D_1}{M_1 R_2^3 D_2} \frac{\pi R_2^2}{4\pi R_1^2} \times 100\% = \frac{M_1 R_2 D_2}{4 M_2 R_1 D_1} \times 100\%$$

where $N_c$ is the number of second particles 25 on the one or more exposed surfaces of the first particle 23

$$\left( N_C = \frac{N_2}{N_1} = \frac{M_2 R_1^3 D_1}{M_1 R_2^3 D_s}; N_1 = \frac{V_1}{P_1} = \frac{3 M_1}{4\pi R_1^3 D_1}; N_2 = \frac{V_2}{P_2} = \frac{3 M_2}{4\pi R_2^3 D_2}; \right.$$
$$\left. P_1 = \frac{4}{3}\pi R_1^3; P_2 = \frac{4}{3}\pi R_2^3; V_1 = \frac{M_1}{D_1}; V_2 = \frac{M_2}{D_2} \right);$$

$R_1$ is the first average diameter of the first particle 23; $R_2$ is the second average diameter of the second particle 25; $M_1$ is the mass of the first particle 23; $M_2$ is the mass of the second particle 25; $R_1$ is the first average diameter of the first particle 23; $R_2$ is the second average diameter of the second particle 25; $D_1$ is the density of the first particle 23; and $D_2$ is the density of the second particle 25. In various instances, the substantially uniform coating comprising the second electroactive material may cover greater than or equal to about 70% of the one or more exposed surfaces of the first particle, optionally greater than or equal to about 75%, optionally greater than or equal to about 80%, optionally greater than or equal to about 85%, optionally greater than or equal to about 90%, and in certain variations, optionally greater than or equal to about 95%. The substantially uniform coating comprising the second electroactive material may have a thickness of greater than or equal to about 1 nm to less than or equal to about 1 μm.

Embodiments of the present technology are further illustrated through the following non-limiting examples.

Example 1

In various instances, the electroactive composite material 60 may comprise a first particle 62 comprising graphite and having a first average diameter ($R_1$) that is greater than or equal to about 1 μm to less than or equal to about 50 μm; and a second particle 64 comprising silicon (Si) and having a second average diameter ($R_2$) that is greater than or equal to about 20 nm to less than or equal to about 200 nm. The particle mixture includes 80 weight % of the graphite and 20 weight % of silicon (Si). As described above, the particle mixture is introduced into a dry-coating device (e.g., Theta Composer) including a rotatable vessel defining a cavity and a rotor disposed within the cavity. The vessel is rotated at a first speed that is greater than or equal to about 20 rpm to less than or equal to about 100 rpm. The rotor is rotated at a second speed that is greater than or equal to about 3000 rpm to less than or equal to about 5000 rpm. The vessel and rotor are rotated for a time greater than or equal to about 5 minutes to less than or equal to about 30 minutes. The clearance between the rotating vessel and rotor is greater than or equal to about 0.05 mm and less than or equal to about 1 mm.

Figure 3:
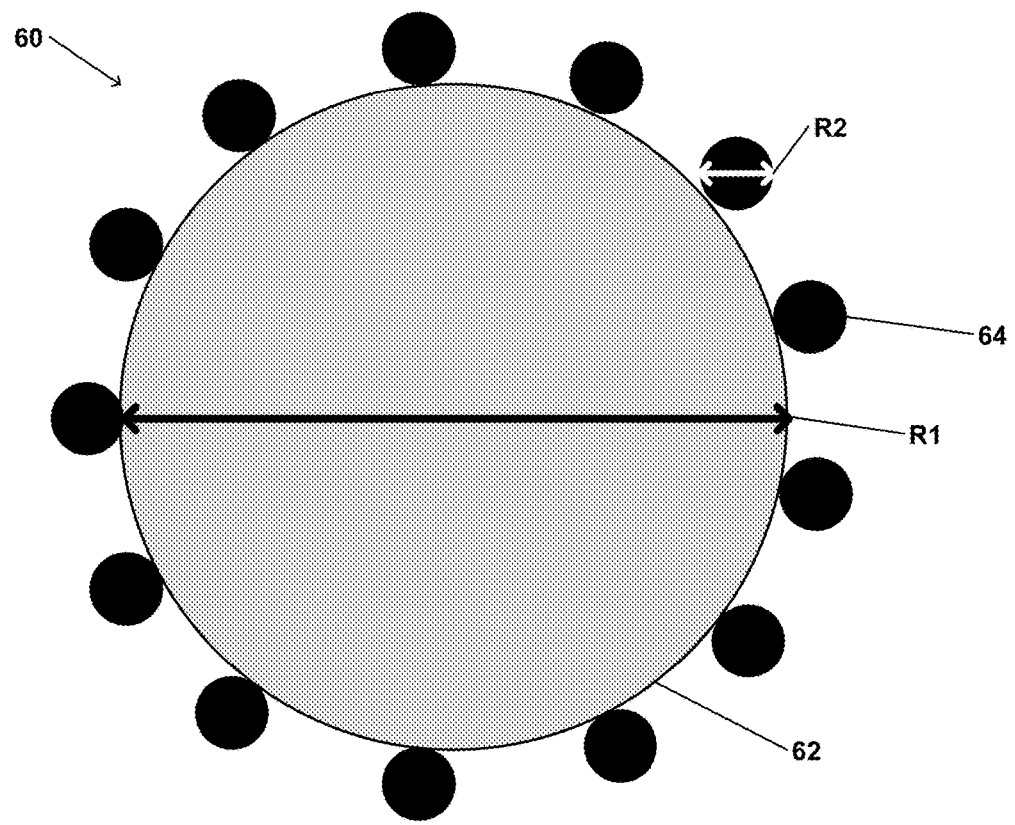
FIG. 3 illustrates an exemplary electroactive composite material prepared in accordance with certain aspects of the present disclosure.
Figure 4A:
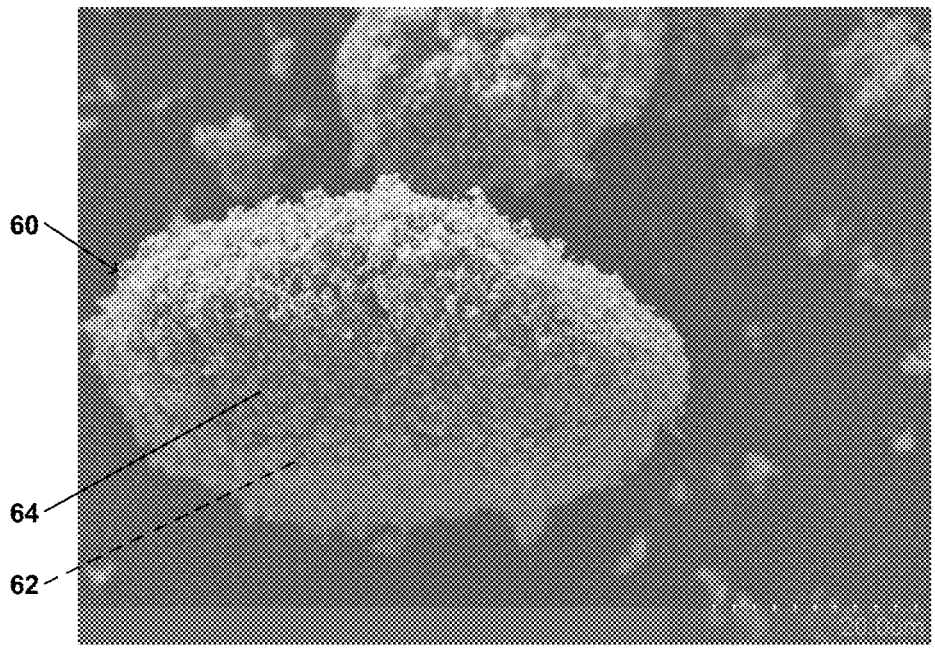
FIGS. 4A-4B are scanning electron microscope images.

Rotation of the vessel and rotor cause silicon (Si) particles 64 to be uniformly disposed on one or more exposed surfaces of graphite particles 62, as seen in FIG. 3, to form an electroactive composite material 60. FIG. 4A provides a scanning electron microscope (SEM) image of electroactive composite material 60. As shown the second silicon (Si) particles 64 are distributed on regions of the exposed surfaces of the first graphite particle 62. Silicon (Si) particles 64 cover greater than or equal to about 90% of the exposed surfaces of the first graphite particle 62.

Figure 4B:
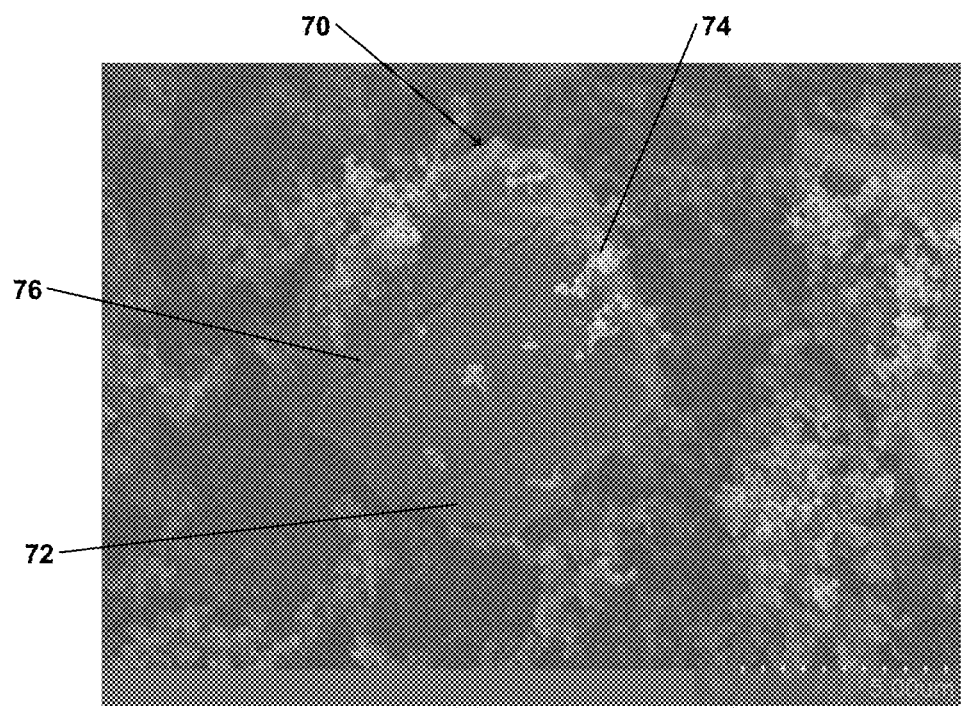

By way of comparison, FIG. 4B provides a comparative image of an electroactive composite material 70 prepared using pestle mixing. The second silicon (Si) particles 74 illustrate a tendency to agglomerate and generally provide poor coverage of the first graphite particle 72. Silicon (Si) particles 74 may cover only about 20% of the exposed surfaces of the first graphite particle 72. Further, in such instances, the silicon (Si) particles 74 are commonly formed separate from the graphite particles 72. Consequently, strong mechanical forces from the solvent-free dry coating process have an increased probability of damaging the graphite particles 72, which causes capacity degradation. For example, as seen, the first particle 72 has cracks 76 that extend its width.

Figure 5:
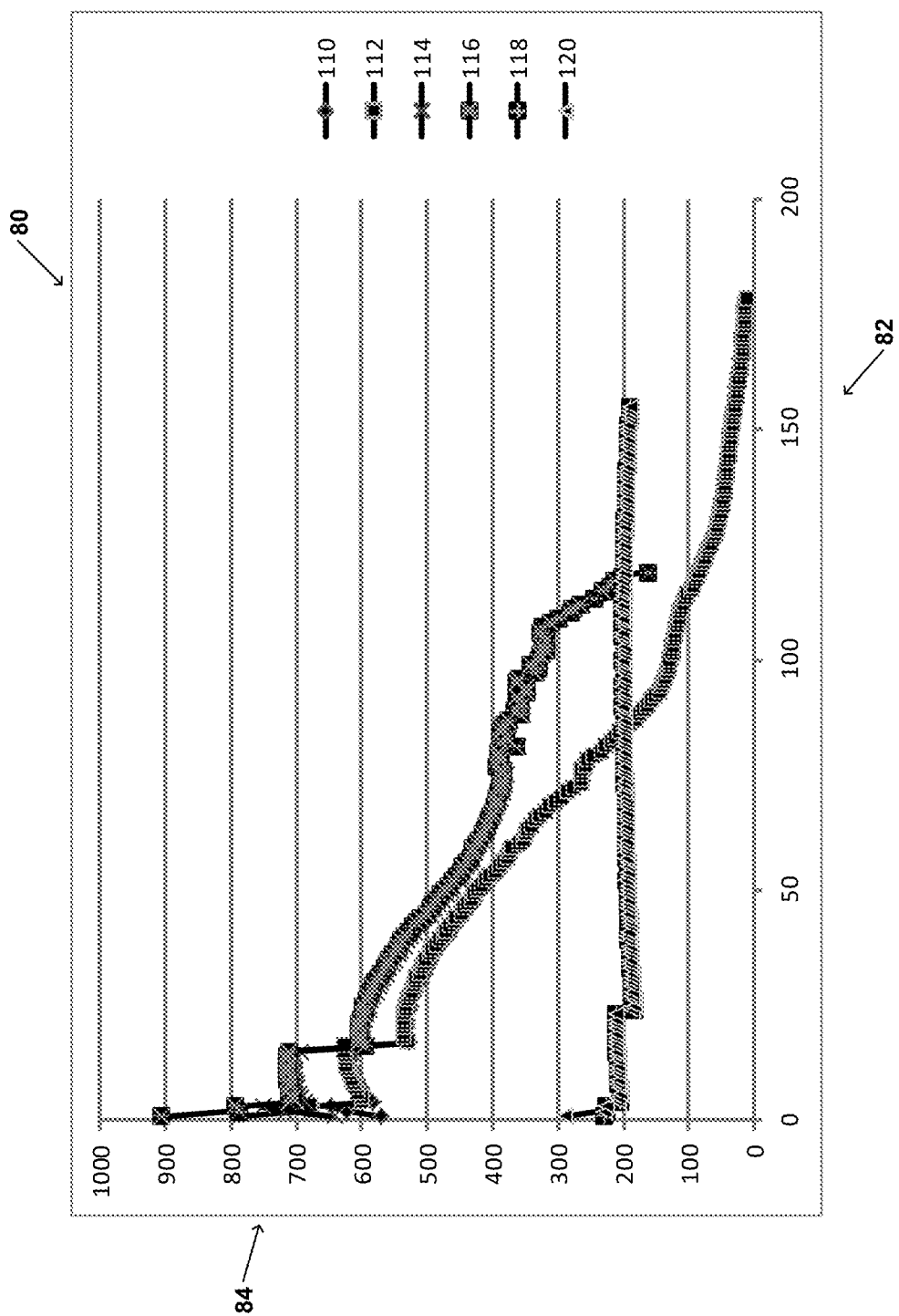
FIG. 5 is a graphical illustration comparing the capacity retention per cycle of electrochemical cells respectively including the electroactive composite materials of FIGS. 4A and 4B.

FIG. 5 shows a graph 80 depicting charge-discharge profiles of comparative coin cells including electroactive composite material 60 and electroactive composite material 70, respectively. The graph 80 has an x-axis 82 showing cycle number and a y-axis 84 showing specific capacity in mAh/g. The charge capacity (mAh/g) profile for the coin cell including electroactive composite material 60 is represented by reference number 114, and the discharge capacity (mAh/g) profile for the coin cell including electroactive composite material 60 is represented by reference number 116. The charge capacity (mAh/g) profile for the coin cell including electroactive composite material 70 is represented by reference number 110, and the discharge capacity (mAh/g) profile for the coin cell including electroactive composite material 70 is represented by reference number 112. The charge capacity (mAh/g) profile for a coin cell including a control is represented by reference number 118, and the discharge capacity (mAh/g) profile for the coin cell including the control is represented by reference number 120. As seen coin cells including electroactive composite material 60 have improved long-term performance over coin cells including electroactive composite material 70. After 100 cycles, coin cells including electroactive composite material 60 has superior performance (e.g., higher capacity retention) over coin cells including electroactive composite material 70. Accordingly, coin cells including electroactive composite material 60 prepared in accordance with certain aspects of the present disclosure show significant improved cycling performance and reduced capacity fade.

Example 2

In various instances, the electroactive composite material 90 may comprise a first particle 92 comprising high energy lithium manganese nickel cobalt oxide ($LiNiMnCoO_2$) and having a first average diameter ($R_1$) that is greater than or equal to about 5 μm to less than or equal to about 50 μm; and a second particle 94 comprising graphite and having a second average diameter ($R_2$) that is greater than or equal to about 1 μm to less than or equal to about 50 μm. The particle mixture includes 80 weight % of the lithium manganese nickel cobalt oxide ($LiNiMnCoO_2$) and 20 weight % of graphene platelet. The particle mixture is introduced into a dry-coating device (e.g., Theta Composer) including a rotatable vessel defining a cavity and a rotor disposed within the cavity. The vessel is rotated at a first speed that is greater than or equal to about 50 rpm to less than or equal to about 100 rpm. The rotor is rotated at a second speed that is greater than or equal to about 3000 rpm to less than or equal to about 5000 rpm. The vessel and rotor are rotated for a time greater than or equal to about 5 minutes to less than or equal to about 30 minutes. The clearance between the rotating vessel and rotor is greater than or equal to about 0.05 mm and less than or equal to about 1 mm.

Figure 6:
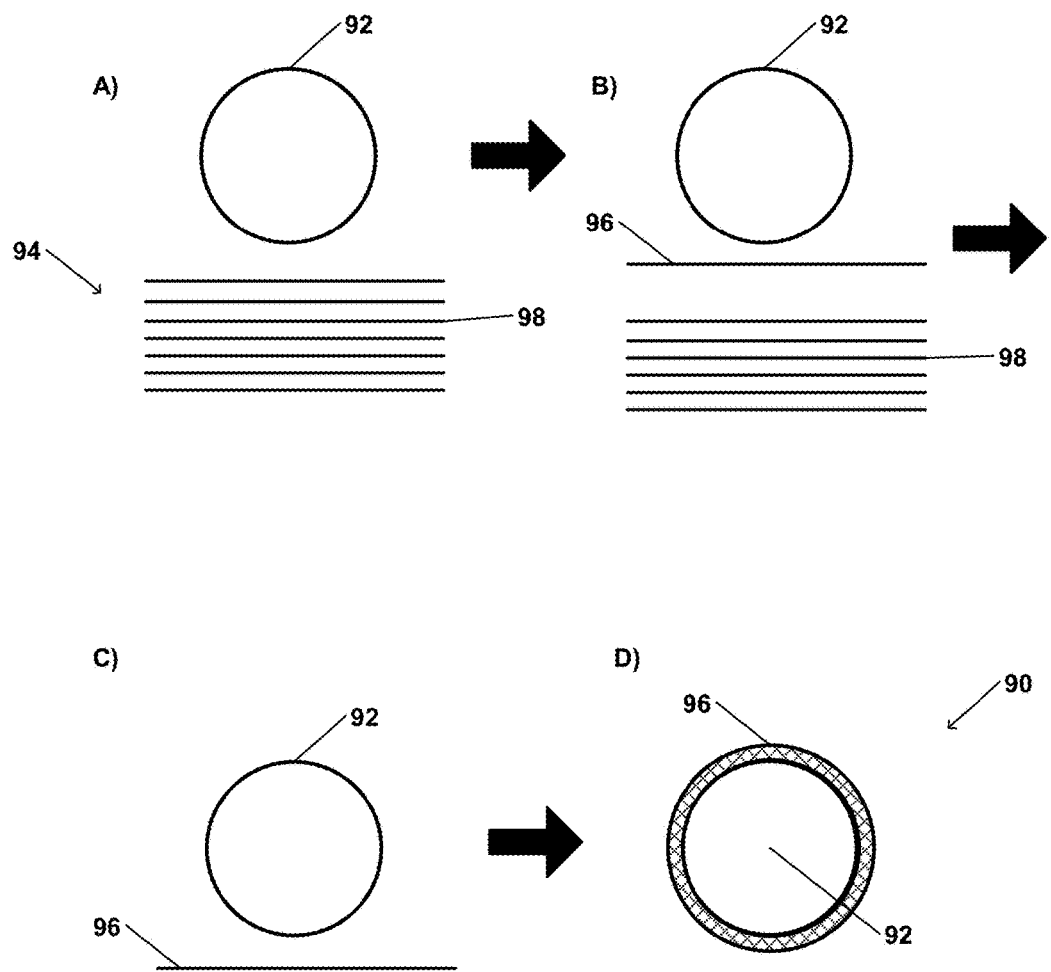
FIG. 6 illustrates another exemplary electroactive composite material prepared in accordance with certain aspects of the present disclosure.

As seen in FIG. 6, rotation of the vessel and rotor causes exfoliation of layers 98 of the second graphene platelet 94 and formation of graphene layers 96. The vessel and rotor continued rotation thereafter causes the graphene layer 96 to wrap around the first high energy lithium manganese nickel cobalt oxide ($LiNiMnCoO_2$) particles 92 forming electroactive composite material 90.

Figure 7:
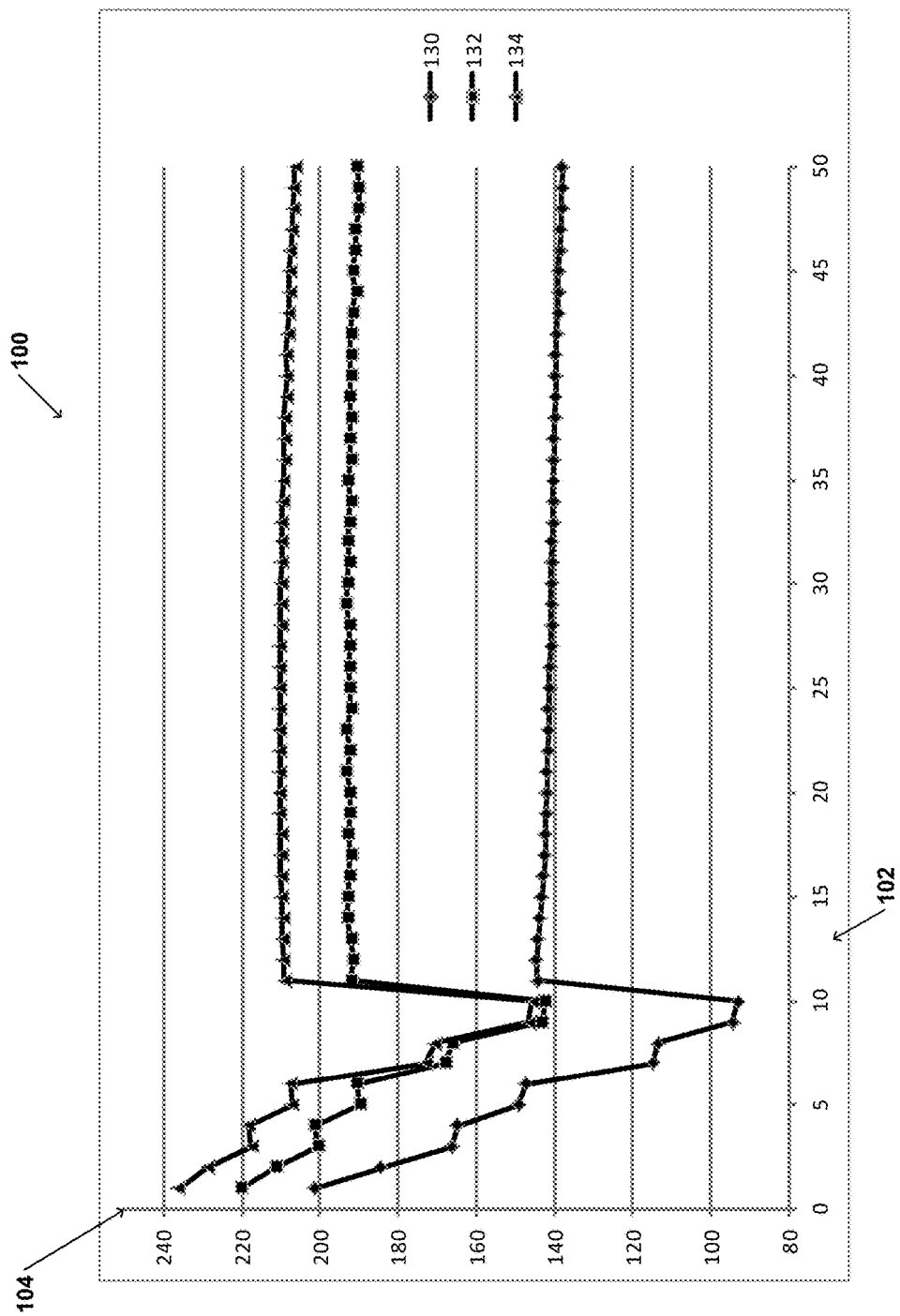
FIG. 7 is a graphical illustration comparing the capacity retention per cycle of respective electrochemical cells including the electroactive composite material of FIG. 6.

FIG. 7 shows a graph 100 depicting charge-discharge profiles of comparative coin cells 130, 132, and 134, including an electroactive material mixed with one or more polymer binders and carbon black to form electrode. Coin cell 130 includes an electroactive composite material comprising high energy lithium manganese nickel cobalt oxide ($LiNiMnCoO_2$). Coin cell 132 includes electroactive material 90, and coin cell 134 includes another electroactive material prepared in accordance with certain aspects of the present disclosure wherein the second mixing particle comprises a nitrogen (N) doped graphene platelet.

The graph 100 has an x-axis 102 showing cycling number and a y-axis 104 showing specific capacity in mAh/g. As seen coin cells 132 and 134 including electroactive composite materials (e.g., 90) prepared in accordance with certain aspects of the present disclosure show significant improved cycling performance and reduced capacity fade. After 20 cycles, coin cells 132 and 134 have superior performance (e.g., higher capacity retention) over coin cell 130. Accordingly, coin cells including electroactive composite materials (e.g. 90) prepared in accordance with certain aspects of the present disclosure show significant improved cycling performance and reduced capacity fade.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making an electroactive composite material for an electrochemical cell, the method comprising:
    introducing a particle mixture into a dry-coating device comprising a rotatable vessel having a wall defining a cavity and a rotor disposed within the cavity, wherein the particle mixture includes a first particle having a first average diameter ($R_1$) that comprises a first electroactive material comprising graphite and a second particle having a second average diameter ($R_2$) that comprises a second electroactive material comprising silicon (Si), wherein the first average diameter ($R_1$) is greater than the second average diameter ($R_2$);
    rotating the rotatable vessel at a first speed in a first direction; and
    rotating the rotor at a second speed greater than the first speed in a second direction opposite to the first direction, wherein a minimum clearance (C) between the wall of the cavity and the rotor is greater than or equal to a sum of the first average diameter ($R_1$) and two times the second average diameter ($R_2$), so that $C \geq R_1 + 2R_2$,
    wherein the particle mixture flows between the wall defining the cavity and the rotor at the clearance to create a substantially uniform coating comprising the second electroactive material on one or more exposed surfaces of the first particle.

2. The method of claim 1, wherein the substantially uniform coating comprising the second electroactive material covers greater than or equal to about 70% of the exposed surface of the first particle.

3. The method of claim 1, wherein the particle mixture includes less than or equal to about 95 weight % of the first particle and greater than or equal to about 5 weight % of the second particle.

4. The method of claim 1, wherein the first average diameter ($R_1$) of the first particle is greater than or equal to about 1 μm to less than or equal to about 100 μm, and the second average diameter ($R_2$) of the second particle is less than or equal to about 5 μm.

5. The method of claim 1, wherein the minimum clearance (C) is greater than or equal to about 0.05 mm and less than or equal to about 1 mm.

6. The method of claim 1, wherein the cavity and rotor of the dry-coating device each have an elliptical cross sectional shape.

7. The method of claim 1, wherein the vessel and rotor are rotated for a time greater than or equal to about 5 minutes to less than or equal to 120 minutes.

8. The method of claim 1, wherein the first speed is greater than or equal to about 50 rpm to less than or equal to about 100 rpm, and the second speed is greater than or equal to about 1000 rpm to less than or equal to about 6000 rpm.

9. A solvent-free method of making an electroactive composite material for an electrochemical cell, the method comprising:
    introducing a particle mixture into a dry-coating device comprising a rotatable vessel having a wall defining a cavity with an elliptical cross-sectional shape and an elliptical shaped rotor disposed within the cavity, wherein the particle mixture comprises a first particle comprising a first electroactive material that comprises graphite and a second particle comprising a second electroactive material that comprises silicon (Si), wherein the first particle has a first average diameter ($R_1$) that is greater than or equal to about 1 μm to less than or equal to about 100 μm and the second particle has a second average diameter ($R_2$) that is less than or equal to about 5 μm;
    rotating the rotatable vessel at a first speed in a first direction; and
    rotating the elliptical shaped rotor at a second speed greater than the first speed in a second direction opposing the first direction, wherein a minimum clearance (C) between the wall of the cavity and the rotor is greater than or equal to a sum of the first average diameter ($R_1$) and two times the second average diameter ($R_2$), so that $C \geq R_1 + 2R_2$;
    wherein the particle mixture flows between the wall defining the cavity and the elliptical shaped rotor at the clearance that creates a substantially uniform coating comprising the second electroactive material on one or more exposed surfaces of the first particle.

10. The method of claim 9, wherein the minimum clearance (C) is greater than or equal to about 0.05 mm and less than or equal to about 1 mm.

11. The method of claim 9, wherein the substantially uniform coating comprising the second electroactive material covers greater than or equal to about 70% of the exposed surface of the first particle and has a thickness of greater than or equal to about 1 nm to less than or equal to about 1 μm.

12. The method of claim 9, wherein the particle mixture includes less than or equal to about 95 weight % of the first particle and greater than or equal to about 5 weight % of the second particle.

13. The method of claim 9, wherein the vessel and rotor are rotated for a time greater than or equal to 5 minutes to less than or equal to 120 minutes, the first speed is greater than or equal to about 50 rpm to less than or equal to about 100 rpm, and the second speed is greater than or equal to about 1000 rpm to less than or equal to about 6000 rpm.

14. A method of making an electroactive composite material for an electrochemical cell, the method comprising:
introducing a particle mixture into a dry-coating device comprising a rotatable vessel having a wall defining a cavity and a rotor disposed within the cavity, wherein the particle mixture includes a first particle having a first average diameter ($R_1$) that includes a first electroactive material comprising a positive electrode material selected from the group consisting of silicon (Si), lithium manganese nickel cobalt oxide ($LiNiMnCoO_2$), and combinations thereof and a second particle having a second average diameter ($R_2$) that includes a second electroactive material selected from the group consisting of graphite, graphene, graphene platelet, and combinations thereof, wherein the first average diameter ($R_1$) is greater than the second average diameter ($R_2$);
rotating the rotatable vessel at a first speed in a first direction; and
rotating the rotor at a second speed greater than the first speed in a second direction opposite to the first direction, wherein a minimum clearance (C) between the wall of the cavity and the rotor is greater than or equal to a sum of the first average diameter ($R_1$) and two times the second average diameter ($R_2$), so that $C \geq R_1 + 2R_2$,
wherein the particle mixture flows between the wall defining the cavity and the rotor at the clearance so that the rotor exfoliates the second electroactive material to create a substantially uniform coating comprising the second electroactive material on one or more exposed surfaces of the first particle.

15. The method of claim 14, wherein the substantially uniform coating comprising the second electroactive material covers greater than or equal to about 70% of the exposed surface of the first particle.

16. The method of claim 14, wherein the particle mixture includes less than or equal to about 95 weight % of the first particle and greater than or equal to about 5 weight % of the second particle.

17. The method of claim 14, wherein the first average diameter ($R_1$) of the first particle is greater than or equal to about 1 μm to less than or equal to about 100 μm, and the second average diameter ($R_2$) of the second particle is less than or equal to about 5 μm.

18. The method of claim 14, wherein the clearance is greater than or equal to about 0.05 mm and less than or equal to about 1 mm.

19. The method of claim 14, wherein the cavity and rotor of the dry-coating device each have an elliptical cross sectional shape.

20. The method of claim 14, wherein the vessel and rotor are rotated for a time greater than or equal to about 5 minutes to less than or equal to 120 minutes; and wherein the first speed is greater than or equal to about 50 rpm to less than or equal to about 100 rpm, and the second speed is greater than or equal to about 1000 rpm to less than or equal to about 6000 rpm.

* * * * *